United States Patent [19]

Aggarwal

[11] 4,013,932
[45] Mar. 22, 1977

[54] APPARATUS FOR CONTROLLING A MAGNETIC CLAMP

[75] Inventor: Pawan Kumar Aggarwal, Cincinnati, Ohio

[73] Assignee: Cincinnati Milacron Inc., Cincinnati, Ohio

[22] Filed: Oct. 6, 1975

[21] Appl. No.: 619,654

[52] U.S. Cl. .................................... 318/39; 361/145
[51] Int. Cl.² ............................................ B23Q 5/10
[58] Field of Search ................ 318/39, 571; 269/8; 335/290, 295; 317/123, 157.5 CL

[56] References Cited
UNITED STATES PATENTS

| 3,571,911 | 3/1971 | Littwin ................................... 269/8 |
| 3,789,279 | 1/1974 | Dempsey ............................. 318/39 |
| 3,859,571 | 1/1975 | Strobl et al. ........................ 317/123 |

FOREIGN PATENTS OR APPLICATIONS 1,210,744  10/1970  United Kingdom ............... 335/295

*Primary Examiner*—Gene Z. Rubinson
*Assistant Examiner*—John J. Feldhaus
*Attorney, Agent, or Firm*—Thomas M. Farrell

[57] ABSTRACT

An apparatus is disclosed for controlling a magnetic clamp on a machine tool having a machine slide driven by a feed motor in response to a motor power source. Current supplied to the feed motor by the motor power source is monitored by a magnetic coil control circuit. The coil control circuit is operative to regulate the supply of current to the magnetic clamp as a function of the current supplied to the feed motor. A machine slide control circuit is disclosed for inhibiting the motion of the machine slide as a function of the current supplied to the feed motor.

6 Claims, 2 Drawing Figures

APPARATUS FOR CONTROLLING A MAGNETIC CLAMP

BACKGROUND OF THE INVENTION

In machine tools, it is sometimes desirable and necessary to clamp a workpiece to a machine table by means of a magnetic clamp device. For example, a grinding machine chuck includes a surface to mount the workpiece and may have imbedded therein an electromagnet for securing the workpiece thereto by virtue of magnetic flux. Since there is no mechanical lock between the workpiece and the chuck surface, it is possible that in the event of a magnetic clamp failure or merely inadequate clamping force, a workpiece may tip or slip on its locating surface. If such movement of a workpiece occurs, machining accuracies are destroyed resulting in a scrap workpiece.

It is known in the electric servomotor art used for machine slide axis speeds that the motors can momentarily exceed the rate of continuous thrust thereby resulting in a jerky movement and exceleration. This thrust of the machine slide during the machining process may be sufficient to overcome the clamping force exerted on the workpiece by the magnetic clamp. Therefore, the workpiece will change its position relative to the cutting tool.

Prior art devices have attempted to compensate for a magnetic clamp failure and subsequent part movement by providing interlock clamps which when actuated, mechanically secure the workpiece. The difficulties inherent in these devices are that the mechanisms themselves are not readily adapted to a wide variety of workpieces and have to be rearranged for different applications. Further, additional expense and design effort is often involved in providing the necessary fail-safe features.

Applicant believes he has solved the difficulty inherent in the prior art devices by the disclosed apparatus which may be readily adapted to existing electric machine slide servomotors. Applicant discloses apparatus which reduces the probability of magnetic clamp failure on a machine tool and may be adapted with relative ease and moderately low cost. Applicant discloses further apparatus which is operative to inhibit machine slide motion under certain conditions which may lead to a magnetic clamp failure.

SUMMARY OF THE INVENTION

According to one embodiment of the invention, an apparatus is provided for controlling a magnetic work clamp comprised in part of a clamp coil which is energized by a coil power supply. The work clamp is contained on a machine tool having a machine slide driven by a feed motor responsive to a motor power source. Means are provided which are responsive to the motor power source for generating a first signal as a function of the power being supplied to the feed motor. Further means are responsive to the first signal for comparing the first signal to a plurality of reference signals to produce a like plurality of control signals. Further means connected between the clamp coil and the coil power supply are responsive to the control signals for regulating the power applied to the clamp coil as a function of the control signals. Finally, means are responsive to the first signal and in communication with the feed motor for inhibiting the motion of the machine slide as a function of the magnitude of said first signal.

DESCRIPTION OF THE PREFERRED EMBODIMENT

Figure 1:
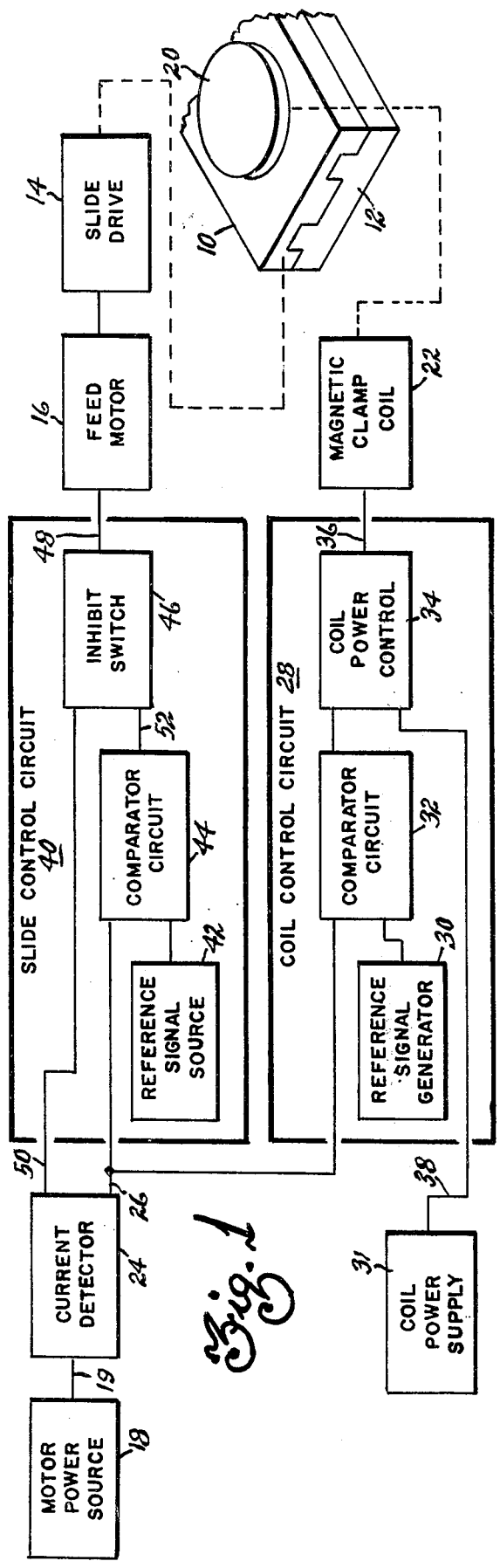
FIG. 1 is a detailed block diagram illustrating the elements of applicant's invention.

FIG. 1 is a detailed block diagram illustrating the elements of applicant's invention. A machine tool slide 10 is slidably carried on a machine tool base 12. A slide drive mechanism 14 is mechanically connected to the machine slide 10 and is responsive to a feed motor 16. The feed motor is energized by a motor power source 18. A magnetic clamping mechanism 20 is attached to a machine slide 10 and contains a magnetic clamp coil 22 embedded therein. The magnetic clamp coil is energized by a coil power supply 31.

The elements described up to this point are old in the art. In operation, a workpiece (not shown) would be placed on the magnetic clamp mechanism 20; and the coil power supply would energize the magnetic clamp coil 22 thereby providing a clamping force between the workpiece and the magnetic clamp mechanism. The motor power source 18 would supply power to the feed motor 16 in response to an external control. Feed motor 16 would actuate the slide drive 14 thereby causing the machine slide 10 containing the workpiece to move with respect to a cutting tool (not shown). As discussed earlier, the magnetic clamping force would remain constant and not responsive to any changes in thrust between the workpiece and the cutting tool that may be generated by the feed motor. This could result in an undesirable motion of the workpiece relative to the cutting tool.

Applicant's apparatus is operative to sense changes in the thrust exerted by the feed motor by sensing the current supplied to the feed motor and regulating the current supplied to the magnetic clamp coil as a function thereof. The achieve this, a current detector 24 is responsive to the motor power source and produces a first signal on line 26 as a function of the current supplied by the motor power source. A coil control circuit 28 is comprised of a reference signal generator 30, a comparator circuit 32 and the coil power control 34. The comparator circuit 32 is responsive to the first signal on the line 26 and a reference signal from the reference signal generator. In normal operation, the coil power control 34 provides a normal current flow on the line 38 to the magnetic clamp coil 22 via the coil power control 34. However, if the feed motor 16 suddenly increases its thrust, a sudden increase in current will occur which is detected by the current detector 24. The comparator circuit 32 detects when the magnitude of the first signal from the current detector exceeds the reference signal. In this situation, the comparator circuit 32 produces a control signal to the coil power control 34 which increases the magnitude of current on line 36 to the magnetic clamp coil 22 thereby substantially increasing the magnetic clamping force. The increase in magnetic clamping force in response to increased thrust by the feed motor minimizes the probability of undesired motion of the workpiece relative to the cutting tool.

In certain situations, the increase of thrust by the feed motor will result in an increased force between the cutting tool and the workpiece which exceeds the clamping force generated by the magnetic clamp coil. A slide control circuit 40 is disclosed for anticipating the situation and inhibiting slide motion in the event that the feed motor 16 provides a thrust which would cause the force between the cutting tool and the workpiece to exceed the clamping force. The slide control circuit 40 is comprised of a reference signal source 42, comparator circuit 44 and an inhibit switch 46. The comparator circuit 44 is responsive to the first signal on line 26 from the current detector 24 and a reference signal from the reference signal source 42. The reference signal source 42 produces a reference signal having a magnitude proportional to the maximum allowable force between the cutting tool and the workpiece. The comparator circuit 44 detects when the magnitude of the first signal, i.e. feed motor current, exceeds the magnitude of the second reference signal and produces an inhibit control signal. The inhibit switch 46 is connected in series with the feed motor 16 and the motor power source 18 by means of the lines 48 and 50, respectively. When the inhibit switch 46 receives an inhibit control signal on line 52, it opens the series circuit thereby terminating the operation of the feed motor 16 and minimizing any further increases in thrust between the workpiece and the cutting tool.

Figure 2:
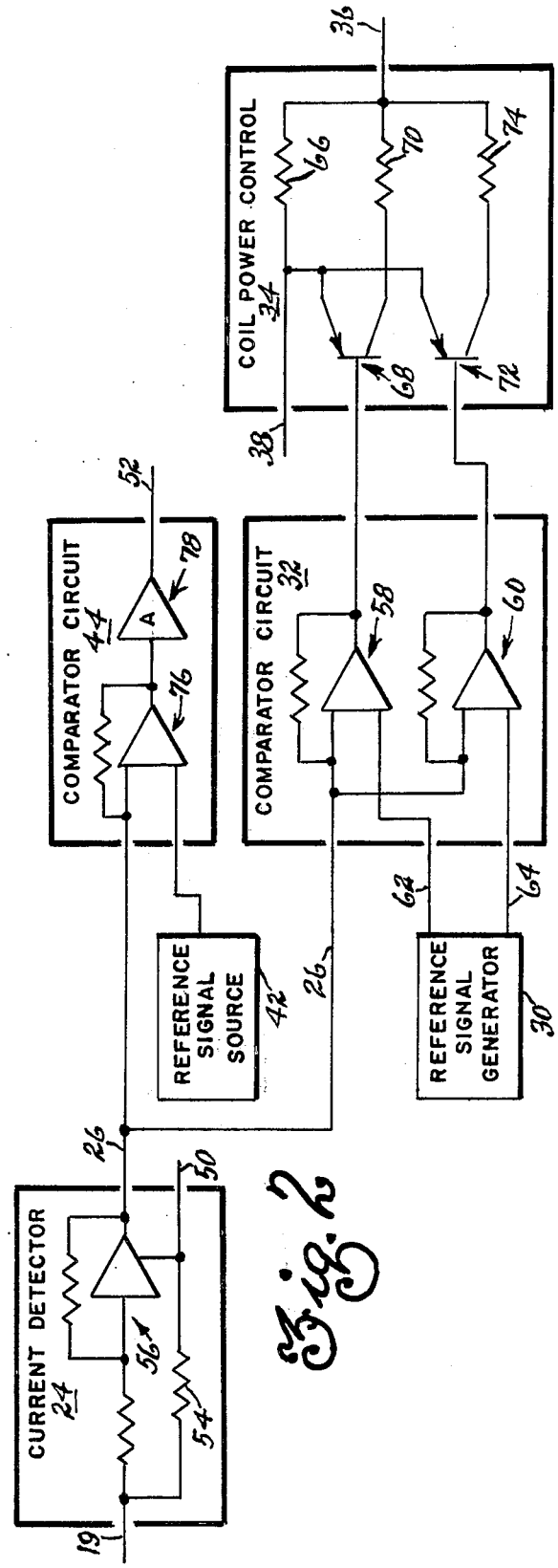
FIG. 2 is a detailed schematic diagram of the current detector, comparator circuits and coil power control.

FIG. 2 is a detailed schematic diagram of the current detector 24, the comparator circuits 32, 44 and the coil power control 34. Within the current detector 24, a current sensing resistor 54 is in a series circuit between the motor power source 18 and the feed motor 16. An amplifier circuit 56 is responsive to the voltage drop across the current sensing resistor 54 for producing the first signal on line 26. Consequently, the first signal has a magnitude proportional to the magnitude of the current being supplied to the feed motor 16.

The comparator circuit 32 is comprised of two operational amplifier circuits 58 and 60. Both amplifier circuits have one input responsive to the first signal and a second input responsive to first and second reference signals on lines 62 and 64, respectively. The second reference signal has a magnitude larger than the first reference signal. Therefore, as the current to the feed motor 16 increases, operational amplifier 58 will detect when the magnitude of the first signal exceeds the magnitude of the first reference signal and produces a first control signal in response thereto. As the magnitude of the current increases further, amplifier circuit 60 will produce a second control signal when the first signal exceeds the magnitude of the second reference signal.

The coil power control 34 is comprised of a first resistance 66, a first switching circuit 68 in series with a second resistance 70 and a second switching circuit 72 in series with a third resistance 74. In normal operation, current from the coil power supply on line 38 flows through the first resistance 66 to the magnetic clamp coil 22 via the line 36. The resistance 66 provides a normal current to the magnetic clamp coil for providing a normal clamping force. In this situation, the switching circuit 68 and 72 are non-conductive. In response to a first control signal from the comparator circuit 32 indicating the first level of excessive current, the switching circuit 68 conducts thereby placing the second resistance 70 in parallel with the first resistance 66. This results in an increased supply of current on line 36 to the magnetic clamp coil thereby providing an increased clamping force. In response to the second control signal from the comparator control circuit 32 indicating a still further excessive current flow to the feed motor 16, the switching circuit 72 conducts thereby placing the resistances 66, 70 and 74 in parallel. This provides an even higher magnitude of current on line 36 to the magnetic clamp coil 22.

Two points should be noted at this time. First, the number of steps of regulation of the current to the magnitude clamp coil is completely arbitrary. Applicant has chosen to illustrate two steps of regulation, however, only one may be used or more than two may be used. Further, the disclosed apparatus illustrates a regulation of the magnetic clamp coil current in discrete steps. As will be appreciated by those who are skilled in the art, this regulation may be achieved on a continuous basis as a function of the continuous changes in magnitude of the first signal. Further, there are many alternative embodiments to the apparatus disclosed in FIG. 2 which may be used to achieve the same function. For example, an ammeter having contacts which may be set at different current magnitudes may be used to replace the current detector and comparator circuit. The ammeter would be connected to measure the current flow between the motor power source 18 and the feed motor 16. As the current increased, thereby energizing the contact responsive to the ammeter reading, switching circuits in the coil power control could be energized to increase the magnitude of current supplied to the magnetic clamp coil 22.

As discussed earlier, there is a maximum current which can be supplied to the magnetic clamp coil thereby providing a maximum clamping force. Consequently, any increase in current to the feed motor which would cause a thrust force between the cutting tool and the workpiece in excess of the maximum clamping force will result in an undesirable motion between the cutting tool and the workpiece. In order to prevent this situation, the reference signal source 42, comparator circuit 44 and inhibit switch 46 are provided. The reference signal source 42 produces a third reference signal having a magnitude as a function of the maximum allowable current which may be supplied to the feed motor 16. The comparator circuit 44 contains an operational amplifier circuit 76 which compares the magnitude of the first signal with the magnitude of the third reference signal. When the magnitude of the first signal exceeds the magnitude of the third reference signal, the operational amplifier 76 produces an inhibit control signal which is amplified by the amplifier 78 and output to the inhibit switch 46 via the line 52. This inhibit control signal is operative to cause the inhibit switch 46 to disconnect the motor power source 18 from the feed motor 16 thereby terminating motion of the machine slide.

While the invention has been illustrated in some detail according to the preferred embodiments shown in the accompanying drawings and while the preferred illustrated embodiments have been described in some detail, there is no intention to thus limit the invention to such detail. On the contrary, it is intended to cover all modifications, alterations and equivalents falling within the spirit and scope of the appended claims.

What is claimed is:

1. An apparatus for controlling a magnetic work clamp comprised in part of a clamp coil being energized by a coil power supply, said work clamp being contained on a machine tool having a machine slide driven by a feed motor responsive to a motor power source, wherein the improvement comprises:

a. means responsive to the motor power source for generating a first signal as a function of the power being supplied to said feed motor;

b. means connected to the generating means for comparing the first signal to a reference signal to produce a control signal; and c. means connected between the clamp coil and the coil power supply and responsive to the comparing means for regulating the power applied to the clamp coil as a function of the control signal.

2. The apparatus of claim 1, wherein the improvement further comprises means responsive to the generating means and in communication with the feed motor for inhibiting the motion of the machine slide as a function of the magnitude of the first signal.

3. The apparatus of claim 2 wherein the generating means comprises:

a. a sensing resistor connected in series with the feed motor and the motor power source; and b. an amplifier circuit having inputs connected across the sensing resistor for producing the first signal having a magnitude proportional to the magnitude of the current being supplied to the feed motor.

4. The apparatus of claim 3, wherein the comparing means comprises:

a. a reference signal generator for producing a reference signal having a predetermined magnitude; and b. a comparator circuit responsive to the reference signal and the first signal for producing a control signal in response to the magnitude of the first signal exceeding the magnitude of the reference signal.

5. The apparatus of claim 4, wherein the regulating means comprises:

a. a regulating resistor connected in series with the clamp coil and the coil power supply for supplying current to the coil on a continuous basis; and b. a switching circuit connected in parallel with the regulating resistor for increasing the magnitude of current to the clamp coil in response to the control signal.

6. The apparatus of claim 5, wherein the inhibiting means comprises:

a. a reference signal source for producing a second reference signal having a predetermined magnitude;

b. a second comparator responsive to the second reference signal and the first signal for producing an inhibit control signal in response to the magnitude of the first signal exceeding the magnitude of the second reference signal; and c. a switching circuit connected in series with the feed motor and the motor power source and being responsive to the inhibit control signal for disconnecting the feed motor from the motor power source in response to said inhibit control signal.

* * * * *